United States Patent
Susca et al.

(10) Patent No.: US 12,345,203 B2
(45) Date of Patent: Jul. 1, 2025

(54) DIRECT CONTROLLED VARIABLE DISPLACEMENT PUMP FUEL SYSTEMS WITH LOW PRESSURE THERMAL RECIRCULATION PUMPING

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 197 days.

(21) Appl. No.: 18/208,451

(22) Filed: Jun. 12, 2023

(65) Prior Publication Data

US 2024/0410358 A1 Dec. 12, 2024

(51) Int. Cl.
*F02C 7/22* (2006.01)
*F02C 7/236* (2006.01)
*F04B 49/12* (2006.01)

(52) U.S. Cl.
CPC ............. *F02C 7/22* (2013.01); *F02C 7/236* (2013.01); *F04B 49/12* (2013.01)

(58) Field of Classification Search
CPC .. F02C 7/22; F02C 7/222; F02C 7/232; F02C 7/236; F02C 9/26; F02C 9/30; F02C 9/48
See application file for complete search history.

(56) References Cited

U.S. PATENT DOCUMENTS 4,332,527 A * 6/1982 Moldovan ............... F02C 9/30
 415/121.2
5,116,362 A * 5/1992 Arline ................... F02C 7/236
 60/734
5,168,704 A * 12/1992 Kast ....................... F02C 9/48
 60/420
6,102,001 A * 8/2000 McLevige ............... F02C 9/26
 123/387

(Continued)

FOREIGN PATENT DOCUMENTS

| EP | 3473842 A1 | 4/2019 |
| EP | 4063654 A2 | 9/2022 |
| JP | 2006138228 A | 6/2006 |

OTHER PUBLICATIONS

Extended European Search Report dated Oct. 11, 2024, for corresponding European Patent Application No. 24181812.9, 6 pgs.

*Primary Examiner* — Alain Chau
(74) *Attorney, Agent, or Firm* — Kinney & Lange, P.A.

(57) ABSTRACT

The system includes a main supply line. A variable displacement pump (VDP) is in fluid communication with an inlet line and with an outlet line. An actuator is operatively connected for direct control of the variable displacement mechanism. A pressure sensor is operatively connected to the outlet line to generate feedback indicative of pressure in the outlet line. A controller is operatively connected to receive the feedback from the pressure sensor, and operatively connected to the actuator to control the variable displacement mechanism based on the feedback. An actuation system is in fluid communication to be supplied with fluid from the outlet line for use in hydraulic actuation. The actuation system includes an actuation return line connecting the hydraulic actuation system in fluid communication to return fluid to the main supply line.

20 Claims, 1 Drawing Sheet

(56) References Cited

U.S. PATENT DOCUMENTS

| | | |
|---|---|---|
| 7,610,760 B2 | 11/2009 | Clements |
| 8,668,465 B2 | 3/2014 | Wadsley et al. |
| 9,574,500 B2 | 2/2017 | Kelly et al. |
| 11,187,229 B2 | 11/2021 | Rhoden et al. |
| 11,203,978 B2 | 12/2021 | O'Rorke et al. |
| 2003/0074884 A1 | 4/2003 | Snow et al. |
| 2004/0011052 A1* | 1/2004 | Clements ............... F02C 9/263 60/773 |
| 2005/0100447 A1* | 5/2005 | Desai .................. F04B 1/26 417/220 |
| 2008/0289338 A1* | 11/2008 | Desai .................. F04C 14/02 60/734 |
| 2010/0089026 A1* | 4/2010 | Baker .................. F02C 9/30 137/565.29 |
| 2012/0234014 A1* | 9/2012 | Reuter .................. F02C 9/263 60/773 |
| 2014/0311599 A1* | 10/2014 | Haugsjaahabink ....... F02C 9/30 137/565.11 |
| 2016/0138473 A1* | 5/2016 | Veilleux, Jr. ............. F02C 7/22 137/59 |
| 2016/0201574 A1* | 7/2016 | Kelly .................. F02C 9/30 60/734 |
| 2017/0321608 A1* | 11/2017 | Crowley ................ F02C 7/222 |
| 2018/0340501 A1 | 11/2018 | Ni et al. |
| 2021/0025374 A1 | 1/2021 | Muehlbauer et al. |
| 2021/0222625 A1* | 7/2021 | O'Rorke ................ F02C 7/236 |
| 2023/0023310 A1 | 1/2023 | Goy |

* cited by examiner

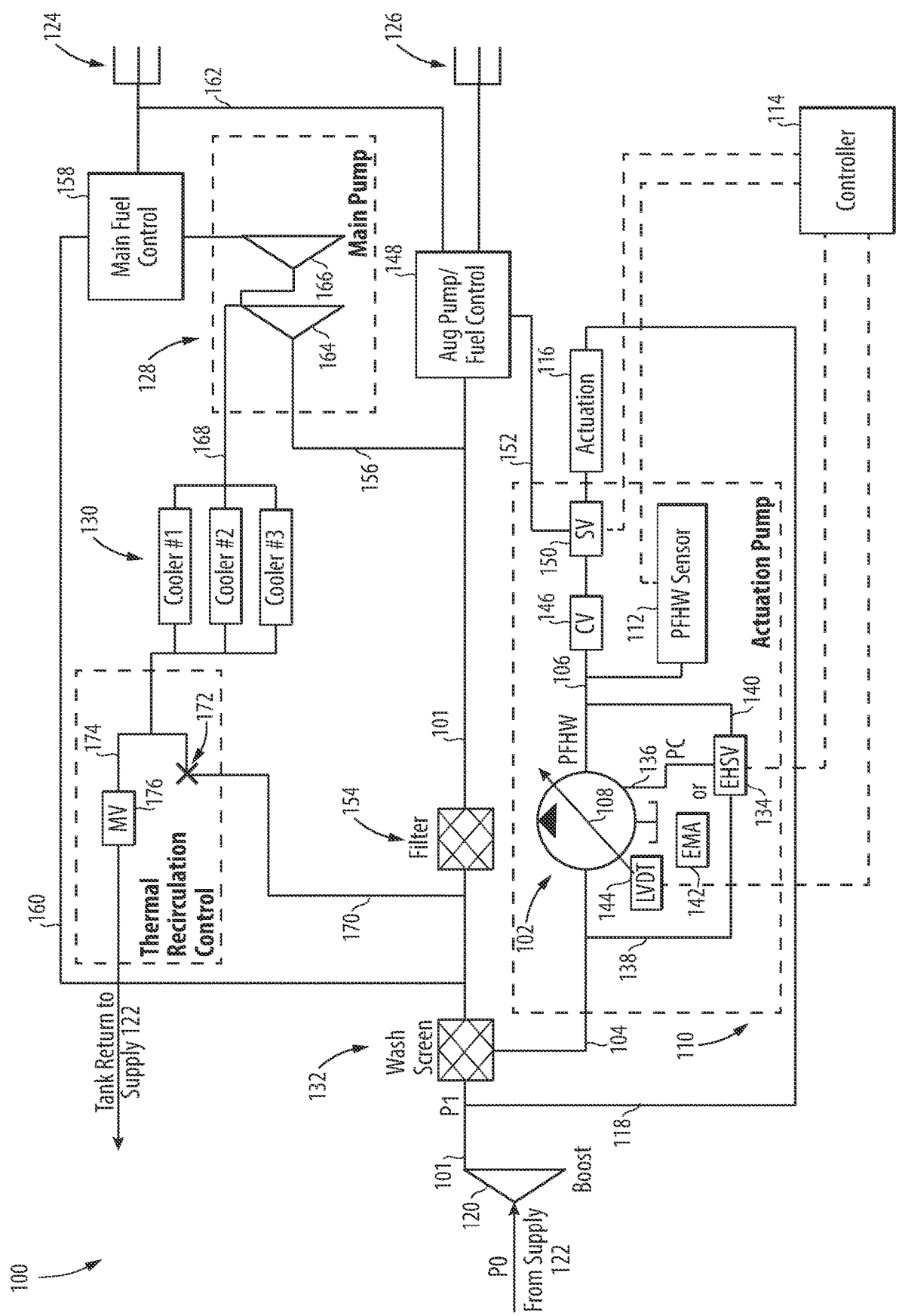

DIRECT CONTROLLED VARIABLE DISPLACEMENT PUMP FUEL SYSTEMS WITH LOW PRESSURE THERMAL RECIRCULATION PUMPING

BACKGROUND

1. Field

The present disclosure relates to pumps, and more particularly to variable displacement pumps and fuel systems such as for use in aircraft.

2. Description of Related Art

There is a need for reducing the weight of fuel systems and for reducing pump system heat rejection to allow aircraft to carry more fuel and increase aircraft heat rejection into the fuel. The conventional techniques have been considered satisfactory for their intended purpose. However, there is an ever present need for improved systems and methods for pumping fuel in fuel systems. This disclosure provides a solution for this need.

SUMMARY

The system includes a main supply line. A variable displacement pump (VDP) is in fluid communication with an inlet line and with an outlet line. The VDP includes a variable displacement mechanism configured to vary pressure to the outlet line. The inlet line is in fluid communication to receive flow for the VDP from the main supply line. An actuator is operatively connected for direct control of the variable displacement mechanism. A pressure sensor is operatively connected to the outlet line to generate feedback indicative of pressure in the outlet line. A controller is operatively connected to receive the feedback from the pressure sensor, and operatively connected to the actuator to control the variable displacement mechanism based on the feedback. An actuation system is in fluid communication to be supplied with fluid from the outlet line for use in hydraulic actuation. The actuation system includes an actuation return line connecting the hydraulic actuation system in fluid communication to return fluid to the main supply line.

A boost pump can be connected in fluid communication between a supply and the main supply line upstream of the inlet line for supplying the VDP and one or more gas generator systems supplied by the main supply line. A wash screen can be included in the inlet line, configured to filter flow entering the inlet line through a screen, and configured to wash the screen with flow through the main supply line.

An electrohydraulic servo valve (EHSV) can have a control port connected in fluid communication with the variable displacement mechanism by a VDP control line for control of flow through the VDP. The EHSV can be connected in fluid communication with both the inlet line and with the outlet line through respective connection lines. The EHSV can be operatively connected to the controller for active control of the EHSV to actuate the variable displacement mechanism based on the feedback. An electromechanical actuator (EMA) can be operatively connected to actuate the variable displacement mechanism. The EMA can be operatively connected to the controller for direct control of the variable displacement mechanism based on the feedback to support flow demands from one or more downstream systems.

A check valve (CV) can be included in the outlet line, configured to block backflow in the outlet line from flowing back to the VDP. An augmentor pump/fuel control component can be connected in fluid communication with the main supply line downstream of the wash screen. The augmentor pump/fuel control can be configured to supply fuel flow from the main supply line to a downstream augmentor. A selector valve (SV) can be included in the outlet line. A backup line can connect in fluid communication between the SV and the augmentor pump/fuel control component. The selector valve can be configured to select flow through the outlet line to the actuation system in a normal operation mode, and to supply the augmentor pump/fuel control in a backup operation mode. The SV can be downstream of the CV in the outlet line.

A filter can be included in the main supply line downstream of the wash screen for filtering flow washing the wash screen. The filter can be upstream of the augmentor pump/fuel control component. A main pump can be connected to be supplied from a branch of the main supply line. The branch can connect to the main supply line downstream of the filter and upstream of the augmentor pump/fuel control component. A main fuel control component can be connected to be supplied by the main pump. The main fuel control component can be connected in fluid communication to supply one or more downstream gas generators. A backup line can connect the gas generators in fluid communication with the augmentor pump/fuel control component for backup.

The main pump can include a first stage and a second stage downstream of the first stage. A cooler system can be connected in fluid communication with an interstage line connected to be supplied by the first stage. The cooler system can be connected in fluid communication with a cooler return line that connects to the main supply line between the wash screen and the filter. The cooler return line can include a fixed throttle/orifice. The cooler return line can include a branch with a metering valve (MV) configured to step pressure down from the cooler system to a tank.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing the interconnections of the actuation system, the augmentor pump/fuel control component, and the main fuel control component.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to reduce the weight of fuel systems and to reducing pump system heat rejection to allow aircraft to carry more fuel and increase aircraft heat rejection into the fuel, compared to more traditional systems.

The system 100 includes a main supply line 101. A variable displacement pump (VDP) 102 is in fluid communication with an inlet line 104 and with an outlet line 106. The VDP 102 includes a variable displacement mechanism 108 configured to vary pressure to the outlet line 106. The inlet line 104 is in fluid communication to receive flow for the VDP 102 from the main supply line 101. An actuator 110 is operatively connected for direct control of the variable displacement mechanism 108. A pressure sensor 112 is operatively connected to the outlet line 106 to generate feedback indicative of PFHW (pressure fuel hydraulic washed) pressure in the outlet line 106. A controller 114 is operatively connected to receive the feedback from the pressure sensor 112, and operatively connected to the actuator 110 to control the variable displacement mechanism 108 based on the feedback. An actuation system 116, e.g. for hydraulic actuation for aircraft mechanisms such as for control surfaces, landing gear, engine components, or the like, is in fluid communication to be supplied with fluid from the outlet line 106. The actuation system 116 includes an actuation return line 118 connecting the hydraulic actuation system 116 in fluid communication to return fluid to the main supply line 101, e.g. upstream of where the inlet line 104 connects to the main supply line 101.

A boost pump 120 is connected in fluid communication between a supply 122, e.g. a fuel tank, and the main supply line 101 upstream of the where the inlet line 104 and the actuation return line 118 connect to the main supply line 101, for supplying the VDP 102 and one or more gas generator systems 124, 126 supplied by the main supply line 101. A wash screen 132 is included in the inlet line 104. The wash screen 132 is configured to filter flow entering the inlet line 104 through a screen so the actuation system 116 receives filtered flow. The wash screen 132 is also configured to wash the screen with flow through the main supply line 101. A filter 154 is included in the main supply line 101 downstream of the wash screen 132 for filtering flow that washes the wash screen 132. The filter 154 is upstream of the augmentor pump/fuel control component 148.

The actuator 110 for the variable displacement mechanism 108 can include an electrohydraulic servo valve (EHSV) 134 that has a control port connected in fluid communication with the variable displacement mechanism 108 by a VDP control line 136 for control of flow through the VDP 102. The EHSV 134 is connected in fluid communication with both the inlet line 104 and with the outlet line 106 through respective connection lines 138, 140. The EHSV 134 is operatively connected to the controller 114 for direct, active control of the EHSV 134 to actuate the variable displacement mechanism 108 based on the feedback provided to the controller 114. In lieu of an EHSV, an electromechanical actuator (EMA) 142 can be operatively connected to actuate the variable displacement mechanism 108, in which case the EMA 142 is operatively connected to the controller 114 for direct, active control of the variable displacement mechanism 108 based on the feedback to support flow demands from one or more downstream systems such as the actuation system 116. A linear variable differential transformer (LVDT) 144 is operatively connected to the variable displacement mechanism 108 to generate feedback for the controller 114 indicative of position of the variable displacement mechanism 108.

A check valve (CV) 146 is included in the outlet line 106, configured to block backflow in the outlet line 106 from flowing back to the VDP 102. An augmentor pump/fuel control component 148 is connected in fluid communication with the main supply line 101 downstream of the wash screen 132. The augmentor pump/fuel control 148 is configured to supply fuel flow from the main supply line 101 to a downstream augmentor system 126. A selector valve (SV) 150 is included in the outlet line 106 downstream of the CV 146. A backup line 152 connects in fluid communication between the SV 150 and the augmentor pump/fuel control component 148. The selector valve is operatively connected to the controller (and/or to the augmentor pump/fuel control component 148) for to select flow from the VDP 102 through the outlet line 106 to the actuation system 116 in a normal operation mode, and to supply the augmentor pump/fuel control 148 in a backup operation mode. The VDP 102, its actuator 110, the CV 146, sensor 112, and the SV 150 make up an actuation pump system, wherein the pump position is set to maintain a pressure and flow schedule to support flow demands for the actuation system 116, e.g. to minimize actuation pumping horsepower.

A main pump 128 is connected to be supplied from a branch 156 of the main supply line 101. The branch 156 connects to the main supply line 101 downstream of the filter 154 and upstream of the augmentor pump/fuel control component 148. A main fuel control component 158 is connected to be supplied by the main pump 128. The main fuel control component 158 is connected in fluid communication to supply one or more downstream gas generators 124 such as gas turbine engine combustors. The main fuel control component 158 has a return line 160 that connects back to the main supply line 101 at a point between the wash screen 132 and the filter 154, and upstream of the return line 170 of the cooler system 130. A backup line 162 connects the gas generators 124 in fluid communication with the augmentor pump/fuel control component 148 as a backup, e.g. there can be a selector valve in the augmentor pump/fuel control component 148 that will select whether fuel flows to the gas generators 124 or to the augmentor system 126 and can prevent backflow from the gas generators 124 to the augmentor system 126 when in a normal operation mode with flow from the component 148 to the augmentor system 126.

The main pump 128, e.g. a centrifugal pump that can be driven on the same shaft or motor with the boost pump 120 or separately, includes a first stage 164 and a second stage downstream 166 of the first stage 164. The cooler system 130 is connected in fluid communication with an interstage line 168 connected to be supplied by the first stage 164, i.e. connected to a point between the first and second stages 164, 166. Those skilled in the art will readily appreciate that while three parallel coolers are shown in cooler system 130 in FIG. 1, any suitable suite of one or more coolers can be used, including series and parallel configurations. Here the coolers are in an independent recirculation loop, e.g. taking off from first stage 164 and returning through the return line 170, but could also be supplied from a point downstream of the second stage 166. The cooler system 130 is connected in fluid communication with the cooler return line 170 that connects to the main supply line 101 between the wash screen 132 and the filter 134. The cooler return line 170 includes a fixed throttle/orifice 172 for controlling recirculation flow through the cooler system 130. The cooler return line 172 includes a branch 174 with a metering valve (MV)

176 configured to step pressure down from the cooler system 130 to the supply 122, e.g. a fuel tank. The MV serves as a thermal recirculation control for the cooler system 130 and allows cooled fuel to return to the tank, e.g. if the flow volume is low on main, augmentor, and actuation systems 158, 148, 116. This configuration provides for a reduced amount of pump work needed to remove heat out of the coolers. The coolers of the cooler system 130 can be downsized relative to more traditional configurations, and the power take off for cooling is also downsized relative to more traditional configurations. The boost pump 120 only needs to raise enough pressure to feed VDP 102 and main pump 128—the coolers of the cooler system 130 would otherwise raise how much pressure rise the boost pump 120 has to provide.

Systems and methods as disclosed herein provide potential benefits including the following. Relative to more traditional configurations, all coolers in a low pressure zone to reduce weight. Systems and methods herein can reduces pump rise required from the boost stage to reduce horsepower extraction. They allow for independent control of thermal recirculation flows, and can reduce inlet temperatures for the actuation pump relative to more traditional configurations.

The methods and systems of the present disclosure, as described above and shown in the drawings, provide for improved pumping and thermal management relative to more traditional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A system comprising:
a main supply line;
a variable displacement pump (VDP) in fluid communication with an inlet line and with an outlet line, wherein the VDP includes a variable displacement mechanism configured to vary pressure to the outlet line, wherein the inlet line is in fluid communication to receive flow for the VDP from the main supply line;
an actuator operatively connected for direct control of the variable displacement mechanism;
a pressure sensor operatively connected to the outlet line to generate feedback indicative of pressure in the outlet line;
a controller operatively connected to receive the feedback from the pressure sensor, and operatively connected to the actuator to control the variable displacement mechanism based on the feedback;
an actuation system in fluid communication to be supplied with fluid from the outlet line for use in hydraulic actuation, wherein the actuation system includes an actuation return line connecting the actuation system in fluid communication to return fluid to the main supply line;
a boost pump connected in fluid communication between a supply and the main supply line upstream of the inlet line for supplying the VDP and one or more gas generator systems supplied by the main supply line; and
a wash screen in the inlet line configured to filter flow entering the inlet line through a screen, and configured to wash the screen with flow through the main supply line.

2. The system as recited in claim 1, further comprising an electrohydraulic servo valve (EHSV) having a control port connected in fluid communication with the variable displacement mechanism by a VDP control line for control of flow through the VDP, wherein the EHSV is connected in fluid communication with both the inlet line and with the outlet line through respective connection lines, and wherein the EHSV is operatively connected to the controller for active control of the EHSV to actuate the variable displacement mechanism based on the feedback.

3. The system as recited in claim 2, further comprising an electromechanical actuator (EMA) operatively connected to actuate the variable displacement mechanism, wherein the EMA is operatively connected to the controller for direct control of the variable displacement mechanism based on the feedback to support flow demands from one or more downstream systems.

4. The system as recited in claim 1, further comprising a check valve (CV) in the outlet line, configured to block backflow in the outlet line from flowing back to the VDP.

5. The system as recited in claim 4, further comprising an augmentor pump/fuel control component in fluid communication with the main supply line downstream of the wash screen, wherein the augmentor pump/fuel control is configured to supply fuel flow from the main supply line to a downstream augmentor.

6. The system as recited in claim 5, further comprising a selector valve (SV) in the outlet line, wherein a backup line connects in fluid communication between the SV and the augmentor pump/fuel control component, wherein the selector valve is configured to select flow through the outlet line to the actuation system in a normal operation mode, and to supply the augmentor pump/fuel control in a backup operation mode, wherein the SV is downstream of the CV in the outlet line.

7. The system as recited in claim 6, further comprising a filter in the main supply line downstream of the wash screen for filtering flow washing the wash screen, wherein the filter is upstream of the augmentor pump/fuel control component.

8. The system as recited in claim 6, further comprising:
a main pump connected to a branch of the main supply line, wherein the branch connects to the main supply line downstream of the filter and upstream of the augmentor pump/fuel control component.

9. The system as recited in claim 8, further comprising:
a main fuel control component connected to be supplied by the main pump, wherein the main fuel control component is connected in fluid communication to supply one or more downstream gas generators.

10. The system as recited in claim 9, wherein a backup line connects the gas generators in fluid communication with the augmentor pump/fuel control component for backup.

11. The system as recited in claim 10, wherein the main pump includes a first stage and a second stage downstream of the first stage, wherein a cooler system is connected in fluid communication with an interstage line connected to be supplied by the first stage.

12. The system as recited in claim 11, wherein the cooler system is connected in fluid communication with a cooler return line that connects to the main supply line between the wash screen and the filter, wherein the cooler return line includes a fixed throttle/orifice.

13. The system as recited in claim 12, wherein the cooler return line includes a branch with a metering valve (MV) configured to step pressure down from the cooler system to a tank.

14. A system comprising:
a main supply line;
a variable displacement pump (VDP) in fluid communication with an inlet line and with an outlet line, wherein the inlet line is in fluid communication to receive flow for the VDP from the main supply line;
an actuator operatively connected for direct control of the variable displacement mechanism;
a pressure sensor operatively connected to the outlet line to generate feedback indicative of pressure in the outlet line;
a controller operatively connected to receive the feedback from the pressure sensor, and operatively connected to the actuator to control the variable displacement mechanism based on the feedback;
an actuation system in fluid communication to be supplied with fluid from the outlet line for use in hydraulic actuation;
a wash screen in the inlet line configured to filter flow entering the inlet line through a screen, and configured to wash the screen with flow through the main supply line.

15. The system as recited in claim 14, and further comprising:
a boost pump connected in fluid communication between a supply and the main supply line upstream of the inlet line for supplying the VDP and one or more gas generator systems supplied by the main supply line.

16. The system as recited in claim 14, further comprising:
a filter in the main supply line downstream of the wash screen for filtering flow washing the wash screen; and
a main pump connected to a branch of the main supply line, wherein the branch connects to the main supply line downstream of the filter.

17. The system as recited in claim 16, wherein the main pump includes a first stage and a second stage downstream of the first stage, wherein a cooler system is connected in fluid communication with an interstage line connected to be supplied by the first stage and wherein the cooler system is connected in fluid communication with a cooler return line that connects to the main supply line between the wash screen and the filter.

18. The system as recited in claim 17, wherein the cooler return line includes a branch with a metering valve (MV) configured to step pressure down from the cooler system to a tank.

19. The system as recited in claim 14, further comprising an augmentor pump/fuel control component in fluid communication with the main supply line downstream of the wash screen, wherein the augmentor pump/fuel control is configured to supply fuel flow from the main supply line to a downstream augmentor.

20. The system as recited in claim 19, further comprising a selector valve (SV) in the outlet line, wherein a backup line connects in fluid communication between the SV and the augmentor pump/fuel control component, wherein the selector valve is configured to select flow through the outlet line to the actuation system in a normal operation mode, and to supply the augmentor pump/fuel control in a backup operation mode, wherein the SV is downstream of the CV in the outlet line.

* * * * *